(12) United States Patent
Lee et al.

(10) Patent No.: US 10,291,832 B2
(45) Date of Patent: May 14, 2019

(54) CAMERA MODULE HAVING A SEALING MEMBER

(71) Applicant: LG INNOTEK CO., LTD., Seoul (KR)

(72) Inventors: Jun Taek Lee, Seoul (KR); Sang Hee Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/383,559

(22) Filed: Dec. 19, 2016

(65) Prior Publication Data

US 2017/0099420 A1    Apr. 6, 2017

Related U.S. Application Data

(63) Continuation of application No. 14/646,267, filed as application No. PCT/KR2013/010801 on Nov. 26, 2013, now Pat. No. 9,560,253.

(30) Foreign Application Priority Data

Nov. 30, 2012    (KR) .......................... 10-2012-0137552

(51) Int. Cl.
*H04N 5/228*    (2006.01)
*H04N 5/225*    (2006.01)
*G03B 17/08*    (2006.01)
*G02B 7/04*    (2006.01)
(Continued)

(52) U.S. Cl.
CPC ............. *H04N 5/2257* (2013.01); *G02B 7/04* (2013.01); *G03B 17/08* (2013.01); *H02K 41/0354* (2013.01); *H04M 1/0264* (2013.01); *H04N 5/2253* (2013.01)

(58) Field of Classification Search
CPC ...... G03B 2205/0007; G03B 2207/005; G03B 2205/0023; G03B 2205/0038; H04N 5/23248; H04N 5/23264; H04N 5/2328; G02B 27/646; G02B 27/64; G02B 27/644
See application file for complete search history.

(56) References Cited

U.S. PATENT DOCUMENTS

2002/0101041 A1* 8/2002 Kameyama .......... H01R 13/521
                                                                  277/628
2004/0157652 A1   8/2004 Yamazaki
2005/0201745 A1   9/2005 Nishizawa
(Continued)

FOREIGN PATENT DOCUMENTS

JP    2005-176185 A    6/2005
JP    2007-124395 A    5/2007
(Continued)

OTHER PUBLICATIONS

International Search Report in International Application No. PCT/KR2013/010801, filed Nov. 26, 2013.

*Primary Examiner* — Chia Wei A Chen
(74) *Attorney, Agent, or Firm* — Saliwanchik, Lloyd & Eisenschenk

(57) ABSTRACT

A camera module is provided. The camera module includes: a printed circuit board on which an image sensor is to be mounted; a base arranged on an upper side of the printed circuit board; a cover can coupled to an upper side of the base; and a sealing member interposed between the base and the cover can.

20 Claims, 5 Drawing Sheets

(51) Int. Cl.
*H02K 41/035* (2006.01)
*H04M 1/02* (2006.01)

(56) References Cited

U.S. PATENT DOCUMENTS

| | | | |
|---|---|---|---|
| 2006/0203627 A1* | 9/2006 | Osaka | G02B 7/08 |
| | | | 369/44.16 |
| 2007/0158773 A1 | 7/2007 | Cheng et al. | |
| 2008/0131110 A1 | 6/2008 | Lee et al. | |
| 2008/0159734 A1 | 7/2008 | Westerweck et al. | |
| 2008/0247059 A1* | 10/2008 | Dong | G02B 7/102 |
| | | | 359/696 |
| 2009/0146174 A1* | 6/2009 | Tanaka | H01L 23/24 |
| | | | 257/99 |
| 2009/0161006 A1* | 6/2009 | Lee | H04N 5/2252 |
| | | | 348/374 |
| 2010/0033616 A1 | 2/2010 | Huang et al. | |
| 2010/0110270 A1* | 5/2010 | Sekimoto | H04N 5/2254 |
| | | | 348/340 |
| 2010/0149410 A1* | 6/2010 | Matsuzawa | H01L 23/10 |
| | | | 348/374 |
| 2010/0232161 A1 | 9/2010 | Aschwanden et al. | |
| 2011/0141338 A1* | 6/2011 | Lee | H04N 5/2251 |
| | | | 348/342 |
| 2011/0235195 A1* | 9/2011 | Ke | G02B 7/023 |
| | | | 359/824 |
| 2011/0262121 A1 | 10/2011 | Yanagisawa et al. | |
| 2011/0292273 A1* | 12/2011 | Kim | G02B 13/009 |
| | | | 348/345 |
| 2012/0001309 A1 | 1/2012 | Soyano et al. | |
| 2012/0008935 A1 | 1/2012 | Cheng et al. | |
| 2012/0104536 A1* | 5/2012 | Seo | H01L 27/14618 |
| | | | 257/459 |
| 2012/0147207 A1 | 6/2012 | Itonaga | |
| 2012/0168214 A1* | 7/2012 | Kashiwagi | H01L 23/3121 |
| | | | 174/257 |
| 2012/0230670 A1* | 9/2012 | Hirooka | H01L 27/14618 |
| | | | 396/529 |
| 2012/0243862 A1* | 9/2012 | Kinoshita | H01L 27/14625 |
| | | | 396/439 |
| 2012/0294602 A1* | 11/2012 | Sekine | H01L 27/14618 |
| | | | 396/502 |
| 2013/0002938 A1* | 1/2013 | Kim | G02B 9/04 |
| | | | 348/360 |
| 2013/0162896 A1* | 6/2013 | Kang | G02B 27/646 |
| | | | 348/374 |
| 2013/0182136 A1* | 7/2013 | Ishizue | G02B 13/0035 |
| | | | 348/208.11 |
| 2013/0329460 A1* | 12/2013 | Mathew | H05K 5/02 |
| | | | 362/612 |
| 2014/0027612 A1 | 1/2014 | Oganesian | |
| 2014/0043515 A1* | 2/2014 | Nitto | H02N 2/103 |
| | | | 348/333.01 |
| 2014/0117479 A1* | 5/2014 | Jan | H04N 5/2257 |
| | | | 257/432 |
| 2014/0117480 A1* | 5/2014 | Jan | H01L 31/02325 |
| | | | 257/432 |
| 2014/0124887 A1* | 5/2014 | Jan | H04N 5/2254 |
| | | | 257/432 |
| 2014/0139693 A1* | 5/2014 | Takei | G03B 5/00 |
| | | | 348/208.11 |

FOREIGN PATENT DOCUMENTS

| | | |
|---|---|---|
| KR | 10-0947950 B1 | 3/2010 |
| KR | 10-0983044 B1 | 9/2010 |

* cited by examiner

CAMERA MODULE HAVING A SEALING MEMBER

CROSS-REFERENCE TO RELATED APPLICATIONS

This application is a continuation of Ser. No. 14/646,267, filed May 20, 2015; which is the U.S. national stage application of international Patent Application No. PCT/KR2013/010801, filed Nov. 26, 2013; which claims priority to Korean Application No. 10-2012-0137552, filed Nov. 30, 2012; the disclosures of each of which are incorporated herein by reference in their entirety.

BACKGROUND OF THE INVENTION

Field of the Invention

The present disclosure relates to a camera module.

Description of Related Art

In recent years, there has been a growing demand for small-sized camera modules in a wide variety of multimedia field such as notebook personal computers, camera-equipped mobile phones, PDAs, or toys, and even for surveillance cameras or image input devices such as information terminals of video tape recorders. In particular, small-sized camera modules for smart phones are in trend of being developed according to growing demands of customers who prefer smaller designs.

Such camera modules are manufactured using image sensor chips of CCD (Charge-Coupled Device) or CMOS (Complementary Metal-Oxide Semiconductor). The image sensor condenses light from an object through a lens, converts a light signal to an electric signal, and transmits an image to a display media such as an LCD display device so that the object may be displayed on the display media.

As the camera module is being miniaturized, components such as the image sensor are also in trend of miniaturization accordingly. Here, fluid impurities which may be generated during the manufacturing process or adhesive impurities such as burr, may be transferred to the image sensor and/or the infrared cutoff filter arranged on an lower portion of the lens holder. Once impurities adhere to the image sensor or the infrared cutoff filter, a fault such as image pollution may occur in the camera module.

SUMMARY OF THE INVENTION

According to an exemplary embodiment of the present disclosure, there is provided a camera module having an improved structure, so as to prevent fluid impurities or adhesive impurities such as burr from inflowing into the inside of the camera module.

In one general aspect of the present disclosure, there is provided a camera module comprising: a printed circuit board on which an image sensor is to be mounted; a base arranged on an upper side of the printed circuit board; a cover can coupled to an upper side of the base; and a sealing member interposed between the base and the cover can.

In some exemplary embodiment of the present disclosure, a lens holder may be installed in a space unit formed between the base and the cover can.

In some exemplary embodiment of the present disclosure, at least one lens may be installed in the lens holder.

In some exemplary embodiment of the present disclosure, one end of the sealing member may be coupled by being inserted to a concave groove formed on a circumferential surface of the base.

In some exemplary embodiment of the present disclosure, the sealing member may be formed of an elastically deformable material, such as rubber or silicon.

In some exemplary embodiment of the present disclosure, the sealing member may be installed on a whole of a circumferential surface of the base.

In some exemplary embodiment of the present disclosure, the sealing member may be elastically deformed in a flat shape by being pressured on an inner circumferential surface of the cover can, and may surface-contact with the inner circumferential surface disposed opposite to the base.

In some exemplary embodiment of the present disclosure, the sealing member may be provided in a shape responding to a flat shape of the base.

In some exemplary embodiment of the present disclosure, the sealing member may include a lubricant coated on a surface contacting with the cover can. The sealing member includes a coating layer formed on a surface contacting with the cover can.

In some exemplary embodiment of the present disclosure, the sealing member may be formed of an epoxy resin in liquid state at room temperature.

In some exemplary embodiment of the present disclosure, the cover can may include an escape groove on an end portion disposed opposite to the base, the sealing member may be coated on the escape groove, and the coated sealing member may permeate into a gap between the base and the lens holder during a hardening process.

In some exemplary embodiment of the present disclosure, the camera module may further comprise a cover member installed on an upper side of the cover can.

In some exemplary embodiment of the present disclosure, the base and the cover can may be combined with each other by an indentation combination.

According to an exemplary embodiment of the present disclosure, image pollution due to impurities may be prevented, by blocking inflow of fluid impurities or impurities such as dust into the internal space of the camera module during or after the assembling process, without a separate sealing process.

DESCRIPTION OF SPECIFIC EMBODIMENTS

Various exemplary embodiments will be described more fully hereinafter with reference to the accompanying drawings, in which some exemplary embodiments are shown.

The present inventive concept may, however, be embodied in many different forms and should not be construed as limited to the example embodiments set forth herein. Rather, these exemplary embodiments are provided so that this description will be thorough and complete, and will convey the scope of the present inventive concept to those skilled in the art.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Descriptions of well-known components and processing techniques are omitted so as not to unnecessarily obscure the embodiments of the disclosure.

Hereinafter, a camera module according to an exemplary embodiment of the present disclosure will be described in detail with reference to the accompanying drawings.

Figure 1:
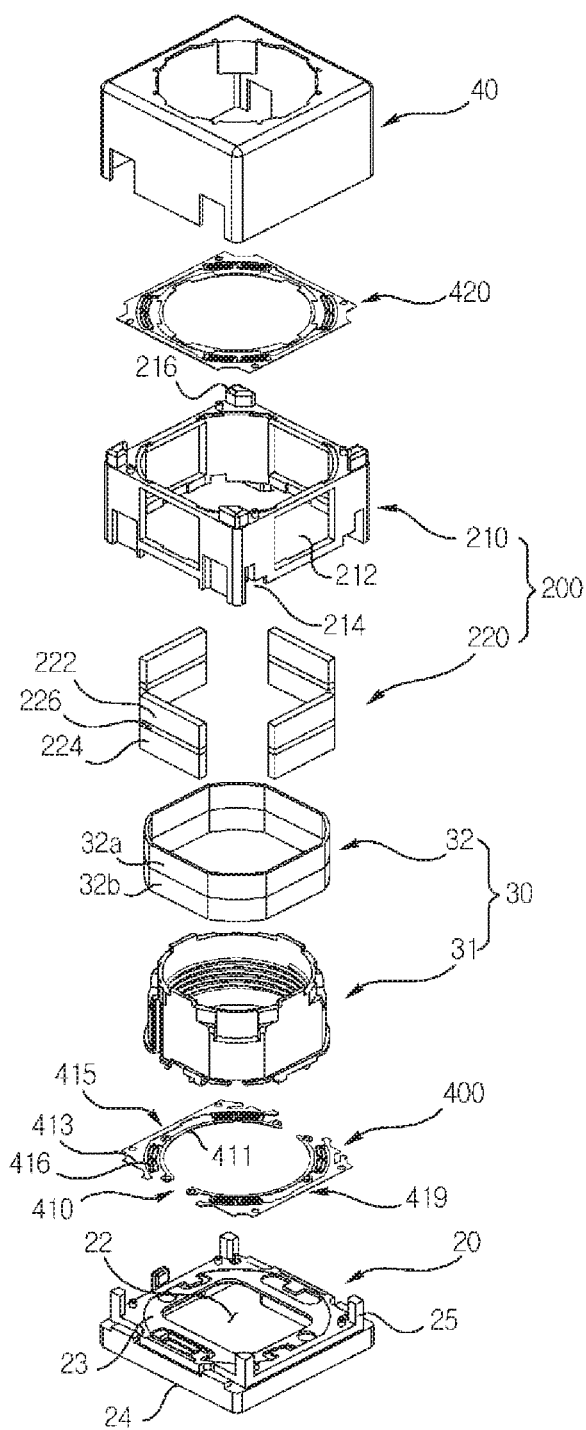
FIG. 1 is an exploded perspective view illustrating a camera module according to an exemplary embodiment of the present disclosure.
Figure 2:
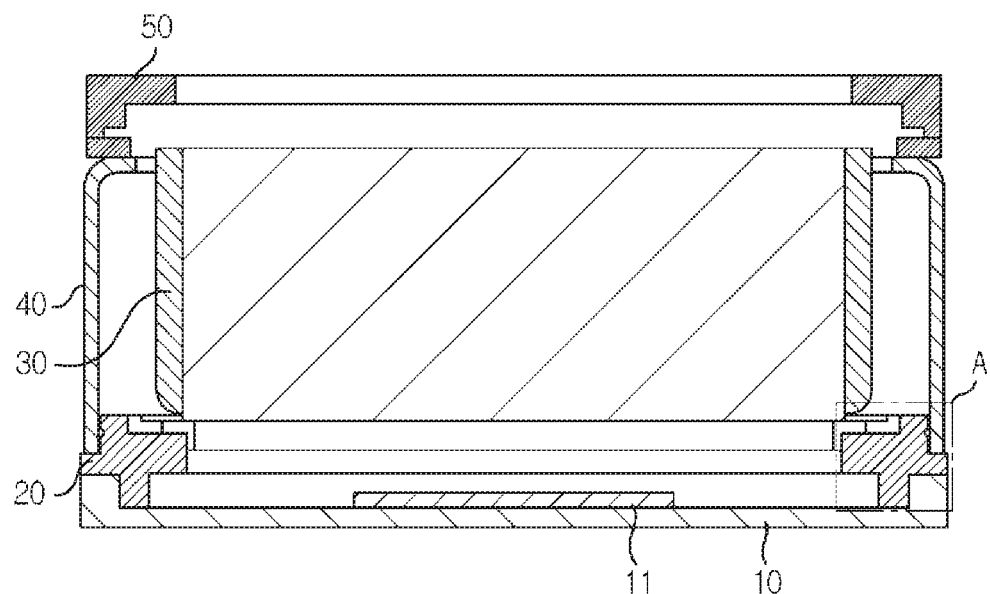
FIG. 2 is a schematic sectional view illustrating a camera module according to a first exemplary embodiment of the present disclosure.
Figure 3:
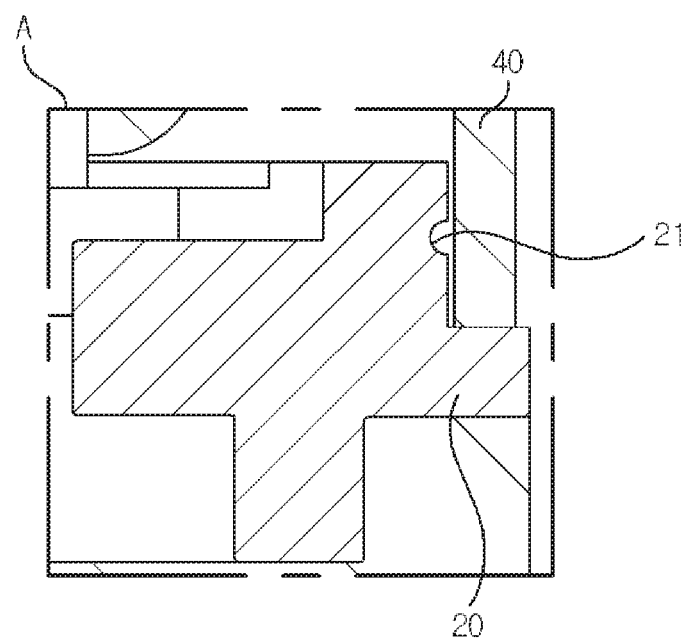
FIGS. 3 and 4 are sectional views illustrating by enlarging a portion 'A' of FIG. 2.
Figure 4:
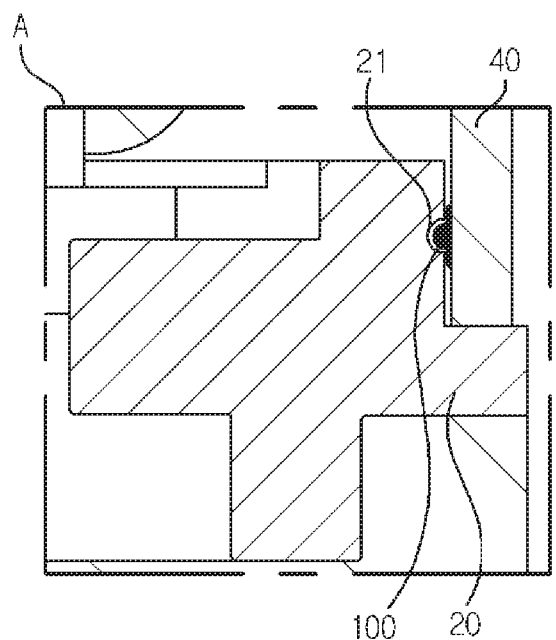
Figure 5:
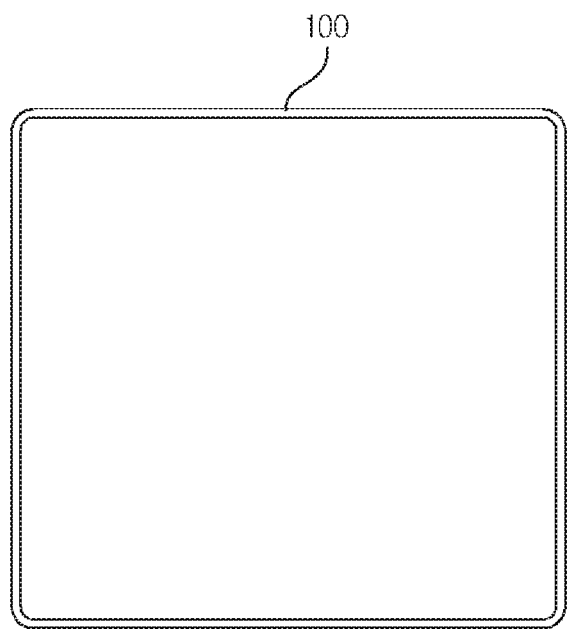
FIG. 5 is a schematic view illustrating an example of a sealing member according to a first exemplary embodiment of the present disclosure.

FIG. 1 is an exploded perspective view illustrating a camera module according to an exemplary embodiment of the present disclosure; FIG. 2 is a schematic sectional view illustrating a camera module according to a first exemplary embodiment of the present disclosure; FIGS. 3 and 4 are sectional views illustrating by enlarging a portion 'A' of FIG. 2; FIG. 5 is a schematic view illustrating an example of a sealing member according to a first exemplary embodiment of the present disclosure; and FIGS. 6 to 9 are sectional views illustrating by enlarging a portion 'A' of FIG. 2 according to second to fifth exemplary embodiments of the present disclosure.

As illustrated in FIGS. 1 and 2, the camera module according to an exemplary embodiment of the present disclosure may include a printed circuit board (100), a base (20), an operator (30), a cover can (40), a cover member (50) and a sealing member (100).

An image sensor (11) may be arranged around a center of the printed circuit board (10). The printed circuit board (10) may include at least one driver member.

The base (20) may be arranged on an upper side of the printed circuit board (10). An infrared cutoff filter (not illustrated in the drawings) may be installed on the base (20). The infrared cutoff filter may cut off infrared ingredients in the light incident to the image sensor (11), so that the image formed in the image sensor (11) can be an imagery that a human can see with eyes. In general, the base (20) may be formed as a resin material by an injection molding.

According to an exemplary embodiment of the present disclosure, the base (20) may be formed in a shape of a rectangular parallelepiped. As illustrated in FIG. 1, the base (20) may include an upper surface (23), a lower surface (24) and an opening (22) penetrating through the upper surface (23) and the lower surface (24). In addition, a coupling pillar (25) to be coupled to a stator (200) (to be described hereinafter) may be formed at each edge on the upper surface (23) of the base (20).

The stator (200) may include a housing (210) and a first driving unit (220).

The housing (210) may be formed in a shape of a quadrangle frame of which upper and lower surfaces are open. An opening (212) configured to couple a first driving unit (220) may be formed on each side surface of the housing (210).

The housing (210) may be coupled to the coupling pillar (25) protruded from the upper surface (23) of the base (20). A coupling groove (214) may be formed on an upper surface of the housing (210). A plurality of bosses (216) configured to fix an upper elastic member (420) of an elastic member (400 (to be described hereinafter) may be formed on an upper surface of the housing (210).

The first driving unit (220) may be fixed at the opening (212) formed on each side surface of the housing (210). Four of the first driving unit (220) may be formed on the housing (210), when the housing (210) is formed in a shape of a box of which top and bottom are opened. Each of the first driving unit (220) may include a flat magnet to generate a magnetic field.

The first driving unit (220) formed in a shape of a flat plate may include a first magnet unit (222), a second magnet unit (224) and a neutral unit (226).

The first magnet unit (222) may be disposed above the second magnet unit (224). In the first magnet unit (222), one side corresponding to an internal side of the housing (210) may have an N-polarity, and the other side corresponding to an external side of the housing (210) may have an S-polarity.

The second magnet unit (224) may be disposed below the first magnet unit (222). In the second magnet unit (224), one side corresponding to an internal side of the housing (210) may have an S-polarity, and the other side corresponding to an external side of the housing (210) may have an N-polarity.

The neutral unit (226) may be formed between the first magnet unit (222) and the second magnet unit (224) it a shape of a band. No polarity may be generated in the neutral unit (226).

The intensity of magnetic field may be enhanced by such structure where the first driving unit (220) is divided into the first and the second magnet unit (222)(224) and the neutral unit (226) is formed between the first and the second magnet unit (222)(224).

The operator (30) may include a bobbin (31) and a second driving unit (32).

The bobbin (31) may be formed in a shape similar to a cylinder of which top and bottom are opened. A lens disposed opposite to an image sensor (11) arranged on a lower portion of the base (20) may be installed on an internal surface of the bobbin (31).

The second driving unit (32) may be disposed on an outer circumferential surface of the bobbin (31). The second driving unit (32) may include a coil block where a long wire insulated with an insulation resin is wound in a shape of a barrel.

The second driving unit (32) may be coupled to an outer circumferential surface of the bobbin (31) using an adhesive. Both end portions of the second driving unit (32) may be electrically connected to a lower elastic member (210) to be described hereinafter.

The second driving unit (32) may include a first coil unit (32*a*) and a second coil unit (32*b*).

The first coil unit (32*a*) of the second driving unit (32) may be disposed on an upper portion of the second coil unit (32*b*). The first coil unit (32*a*) may be wound in a first direction so that the current may flow in a forward direction and may generate an electromagnetic field.

Meanwhile, the second coil unit (32*b*) may be disposed on a lower portion of the first coil unit (32*a*). The second coil unit (32*b*) may be wound in a second direction opposite to the first direction so that the current may flow in a backward direction and may generate an electromagnetic field in the backward direction.

Attractive force or repulsive force may be generated in response to the magnetic field generated from the first magnet unit (222) of the first driving unit (220) and the magnetic field generated from the first coil unit (32a) of the second driving unit (32). In addition, attractive force or repulsive force may be generated in response to the magnetic field generated from the second magnet unit (224) of the first driving unit (220) and the magnetic field generated from the second coil unit (32b) of the second driving unit (32).

The operator (30) may move upward or downward from the base (20) by the magnetic field generated from the first driving unit (220) and the magnetic field generated from the second driving unit (32).

Referring to FIG. 1, the elastic member (400) may include an upper elastic member (410) and a lower elastic member (420).

According to an exemplary embodiment of the present disclosure, the elastic member (400) may elastically support the operator (30). The elastic member (400) may locate the operator (30) to be spaced at a predetermined interval from an upper surface of the base (200), when a driving signal is not applied to the second driving unit (32). That is, the elastic member (400) may locate the operator (30) as to be floating over the upper surface of the base (200), when a driving signal is not applied to the second driving unit (32).

According to an exemplary embodiment of the present disclosure, the forward direction current or backward direction current may be applied to the second driving unit (32) of the operator (30) in a state where the operator (30) is floating over the upper surface of the base (200) because the driving signal is not applied to the second driving unit (32). Then the operator (30) may be bidirectionally driven in a direction toward an upper surface of the base (20) or in a direction departing from the upper surface of the base (20). Thereby the current amount and electric power consumption required in order to drive the operator (30) may be significantly reduced.

The lower elastic member (410) may be disposed on the base (20). The lower elastic member (410) may be formed as a pair electrically insulated from each other.

Each of the pair of the lower elastic members (410) may include an internal elastic unit (411), an external elastic unit (413) and a connecting elastic unit (415).

The internal elastic unit (411) may be disposed on a lower surface of the bobbin (31) of the operator (30). Therefore, each of the internal elastic unit (411) may be formed in a shape of a half-moon plate.

The external elastic unit (413) may be arranged on an external side of the internal elastic unit (411). The external elastic unit (413) may be arranged on an upper surface of the base (20).

An end portion of the first coil unit (32a) of the second driving unit (32) of the operator (30) may be electrically connected to either one of the pair of the lower elastic members (410). An end portion of the second coil unit (32b) of the second driving unit (32) of the operator (30) may be electrically connected to the other one of the pair of the lower elastic members (410).

Referring back to FIG. 1, the upper elastic member (420) may be disposed on an upper surface of the bobbin of the operator (30). The upper elastic member (420) may elastically support the bobbin (31).

According to an exemplary embodiment of the present disclosure, the second driving unit (32) may be floating over the upper surface of the base (20) due to the elastic member (400), when the driving signal is not applied to the second driving unit (32). Here, the operator (30) may be floating over the upper surface of the base (20) in a state where a little slack occurs due to self-weight of the operator (30).

However, when the slack of the operator (30) occurs due to the self-weight of the operator (30), the first magnet nit (222) of the first driving unit (220) of the stator (200) may not be aligned with the first coil unit (32a) of the operator (30), and the second magnet unit (224) of the first driving unit (220) of the stator (200) may not be aligned with the second coil unit (32b) of the operator (30). In such case, a section where the operator cannot linearly move may be generated, when the driving signal applied to the second driving unit (32). Thereby, the focusing time may be delayed, and focusing fault may also occur.

According to an exemplary embodiment of the present disclosure, the second driving unit (32) of the operator (30) may be arranged to be aligned with the first driving unit (220), so that the operator (30) may be driven linearly and bidirectionally from the base (20) as a center, in consideration of the slack of the operator (30) occurs due to self-weight of the operator (30).

More particularly, in order that the operator (30) can be driven linearly from the base (20) as a center, the center of neutral unit (226), which is formed between the first magnet unit (222) and the second magnet unit (224) of the first driving unit (220) of the stator (200), may be aligned with the center of the first coil unit (32a) and the second coil unit (32b) of the second driving unit (32) of the operator (30).

Meanwhile, at least one lens may be arranged inside of the bobbin (31). The lens arranged in the bobbin (31) may transmit an external image to the image sensor (11). In general, at least three lenses may be arranged inside of the bobbin (31). The bobbin (31) may be installed reciprocatively movable in a direction parallel to a progress direction of the light. Otherwise, the bobbin (31) may be arranged by being fixed to the upper surface of the base (20).

Meanwhile, when an actuator of single-lens moving type is used as a hand-shaking correction unit or an auto focusing unit, an actuator which is able to control an outermost lens to move upward, move downward, and/or tilt with respect to an optical axis may be installed in order to perform the hand-shaking correction unit and auto focusing functions. Such single-lens moving actuator may move of the outermost lens arranged in a center upward and downward, or modify the shape of the outermost lens, so as to control a focus of a trespassing image. The actuator may be formed as any one of a MEMS (Micro-ElectroMechanical Systems) actuator, a liquid crystal lens, a non-MEMS actuator such as a piezoelectric polymer lens (piezo polymer lens), a silicon type actuator and a liquid lens.

A cover can (40) coupled to the base (20) may block inflow of external impurities as well as seal up an internal space of the camera module. The cover can (40) may be formed of a resin material. Otherwise, the cover can (40) may be formed of a metallic material so as to block electromagnetic wave inflowing or outflowing from outside or inside of the camera module, when a shield can of a metallic material is omitted.

A yoke and a magnet made of a metallic material may be installed on an inner circumferential surface of the cover can (40), when the auto focusing unit is provided as a VCM (Voice Coil Motor). Such structure corresponds to a know structure of the VCM. Thus, the particular description thereof may be omitted.

A cover member (50) may close the opening of the cover can of which upper portion is open, by being coupled to the upper portion of the cover can (40). A through-hole may be formed a center of the cover member (50), so that an external image can be delivered to the lens installed in the bobbin (31) of the operator (30). Here, a diameter of the through-hole may be formed larger than a diameter of the lens.

Meanwhile, the present exemplary embodiment may be characterized by a sealing member (100) configured to block inflow of impurities such as dust into the internal space of the camera module during or after the assembling process.

The sealing member (100) may be provided as an O-ring of end surface is circular. As illustrated in FIGS. 3 and 4, the sealing member (100) may be inserted to a concave groove (21) formed on a circumferential surface of the base (20) in a shape responding to the sealing member (100). The sealing member (100) may be formed of a various materials, including elastically deformable materials, such as rubber or silicon.

As described in the above, once the sealing member (100) is installed in the concave groove (21) formed on a circumferential surface of the base (20), inflow of impurities into the internal space of the camera module may be blocked during or after the assembling process of the cover can (40) and the base (20).

In particular, a sealing process, where epoxy or other chemical substances is coated and seals after the assembling process of the cover can (40) and the base (20), may be omitted. Thus, the working man-hour may be reduced. In addition, the risk of fault in the assembled camera module due to mistakes during the sealing process, such as faulty coating of the epoxy, may be eliminated.

In addition, in the conventional art, the internal components of the camera module may be contaminated by the epoxy or other chemical substances, when too much amount of such epoxy or other chemical substances inflow inside of the camera module during the sealing process. However, such contamination problem may be prevented, when the sealing member (100) is interposed between the base (20) and the cover can (40) according to the present exemplary embodiment.

Meanwhile, in general, the base (20) may be formed by injection molding using a resin material and a mold. Therefore, the base (20) may be simply formed whereby a shape of the concave groove (21) is provided in the mold configured to form the base (20) and molded by injection, without performing a separate post-process. Therefore, the risk of process increasing due to the post-process of the concave groove (21) may be eliminated.

FIG. 4 is an enlarged view illustrating a coupling state of the base (20) and the cover can (40) according to an exemplary embodiment of the present disclosure. As illustrated in FIG. 4, since the sealing member (100) may be formed of an elastically deformable material, an end surface of a portion, which is inserted to the concave groove (21), of the sealing member (100) may be maintained in a shape of a semicircle. On the other hand, another portion protruded from the concave groove (21) may be elastically deformed due to interference with the inner circumferential surface of the cover can (40), so that the contact surface of the sealing member (100) with the cover can (40) can be deformed to a shape of flat plane. Thereby, the clearance space between the base (20) and the cover can (40) may be sealed with the deformed sealing member (100) due to such elastic deformation of the sealing member (100).

FIG. 5 is a view illustrating a shape of a sealing member (100) according to an embodiment of the present disclosure.

As illustrated in FIG. 5, since the base (20) and the cover can (40) may be generally provided in a shape of a quadrangle, the sealing member (100) may also be provided in a shape of a quadrangle accordingly.

Otherwise, the sealing member (100) may be provided in a shape of circular ring to be coupled. However, in such case, some partial section of the sealing member (100) may be elastically deformed too much. Thus, the partial section of the sealing member (100) may be broken when used for a long period of time.

According to an exemplary embodiment of the present disclosure, as described in the above, the sealing member (100) may effectively prevent impurities from inflowing inside of the camera module, without performing a separate process to coat with sealing epoxy or chemical substance.

In addition, the base (20) and the cover can (40) may be pressured due to elastic restoring force of the sealing member (100). Thereby, stronger binding force between the base (20) and the cover can (40) may be maintained, in comparison with when the base (20) and the cover can (40) are assembled by a simple indentation combination.

Meanwhile, according to an exemplary embodiment of the present disclosure, a lubricant for reducing frictional force may be coated on a surface of the sealing member (100) during the indentation process of the base (20) and the cover can (40), in order to minimize interference of the sealing member (100). In such case, the effect of friction force incensement, whereby the sealing member (100) is elastically deformed due to interference with the inner circumferential surface of the cover can (40) and the contacting surface thereof is broadened, may be minimized.

Otherwise, the surface of the sealing member (100) may be coated with an elastically deformable material containing a lubrication ingredient, such as TEFLON™. In such case, the indentation process of the base (20) and the cover can (40) may be smoothly performed, without coating a separate lubricant.

Figure 6:
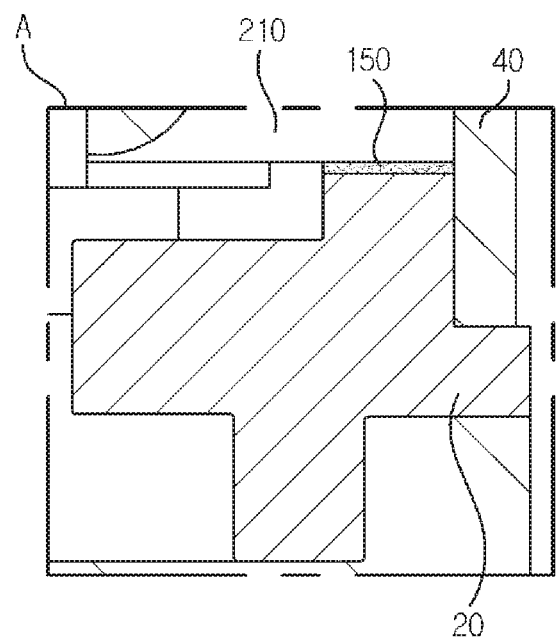
FIGS. 6 to 9 are sectional views illustrating by enlarging a portion 'A' of FIG. 2 according to second to fifth exemplary embodiments of the present disclosure.

Meanwhile, FIG. 6 is a sectional view illustrating by enlarging a portion 'A' of FIG. 2 according to a second exemplary embodiment of the present disclosure.

Referring to FIG. 6, the based (20) and the housing (210) may be coupled by being fitted with each other. The gap space, which may be generated by tolerance, etc., may be sealed with the sealing member (150) formed by being coated with epoxy resin.

That is, when coupling the base (20) with the housing (210), once the sealing member (150) formed of epoxy resin is coated at a predetermined thickness in the gap portion in question, the portion coated with the sealing member (150) may seal up the gap while being hardened, and therefore, inflowing of external impurities may be blocked.

Meanwhile, the sealing member (150) may be coated on an upper surface of the base (20). Of course, the sealing member (150) may be coated on a side surface of the base (20) or on an internal side surface of the housing (210). However, when the sealing member (150) is coated on the side surface of the base (20) or on the internal side surface of the housing (210), there is a risk that the coated sealing member (150) overflows and contaminates other components. Therefore, the sealing member (150) may be coated on an edge portion of the upper surface of the base (20), where the least impact is caused even when the sealing member (150) overflows at the coating point.

Figure 7:
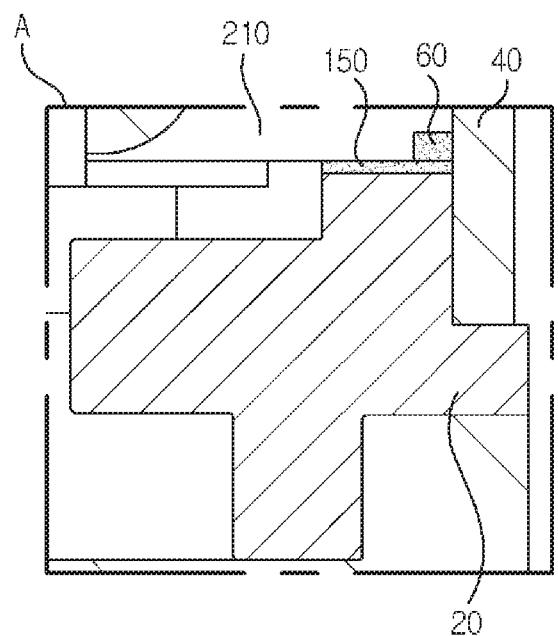

FIG. 7 is a sectional view illustrating by enlarging a portion 'A' of FIG. 2 according to a third exemplary embodiment of the present disclosure.

Referring to FIG. 7, a sealing member (150) formed of epoxy resin may be coated in the gap formed between the base (20) and the housing (210), as in the second exemplary embodiment described in the above. Here, however, the sealing member (150) formed of epoxy resin in liquid state at room temperature may be priorly coated at thickness above a predetermined level in an escape groove (60) formed on the housing (210). Here, the escape groove (60) may be formed on a surface opposite to the base (20). Afterwards, the assembling of the base (20) and the housing (210) may be performed.

In such case, the sealing member (150) injected and coated in the escape groove (60) may be hardened, while being flowing down to the base (20) during a heat hardening process and inflowing to a spaced portion where the inflow of impurities may occur. Thereby, the gap, which can be generated when coupling the base (20) with the housing (10), may be sealed. Therefore, the inflow of impurities through the gap may be prevented. Meanwhile, the escape groove (60) may be formed on a whole of a bottom surface end of the housing (210), or may be formed on a partial section of the bottom surface end of the housing (210).

Figure 8:
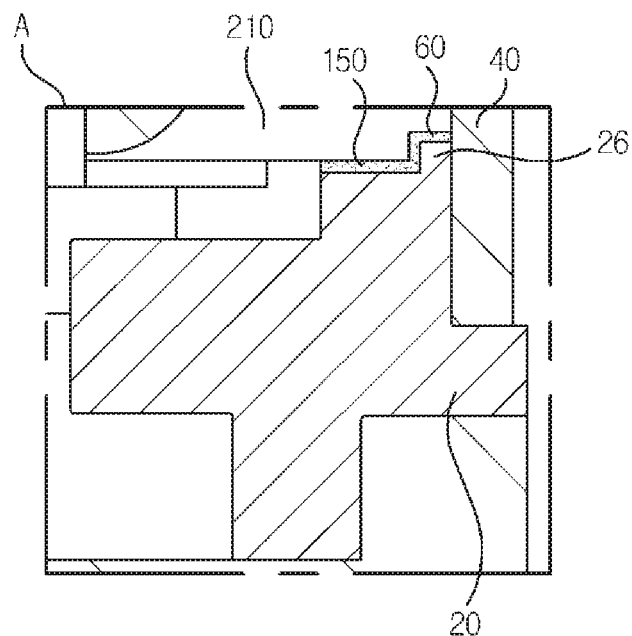

FIG. 8 is a sectional view illustrating by enlarging a portion 'A' of FIG. 2 according to a fourth exemplary embodiment of the present disclosure.

Referring to FIG. 8, a sealing member (150) formed of epoxy resin may be coated in the gap formed between the base (20) and the housing (210), as in the second exemplary embodiment described in the above. Here, however, the sealing member (150) formed of epoxy resin in liquid state at temperature may be priorly coated in an escape groove (60) formed on the housing (210). Here, the escape groove (60) may be formed on a surface opposite to the base (20). Here, a protruded portion (26) may be formed at a position on the base (20) responding to the escape groove (60). Here, the protruded portion (26) may be provided in a shape complementary to the escape groove (60). Here, the sealing member (150) may be coated in the gap formed between the protruded portion (26) and the escape groove (60). Afterwards, the assembling of the base (20) and the cover can (40) may be performed.

In such case, the sealing member (150) injected and coated in the escape groove (60) may be hardened, while being flowing down to the base (20) during a heat hardening process and inflowing to a spaced portion where the inflow of impurities may occur, for example, to the base (20) and the housing (210). Thereby, the gap, which can be generated when coupling the base (20) with the housing (210), may be sealed. Therefore, the inflow of impurities through the gap may be prevented.

Figure 9:
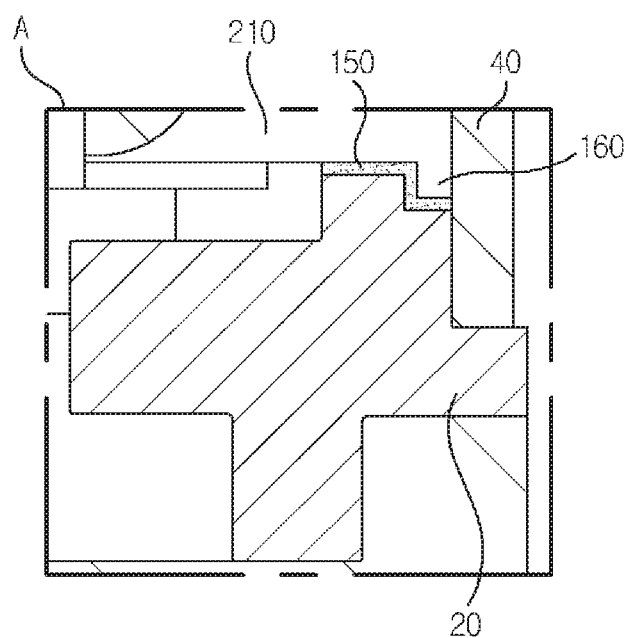

FIG. 9 is a sectional view illustrating by enlarging a portion 'A' of FIG. 2 according to a fifth exemplary embodiment of the present disclosure.

Referring to FIG. 8, a sealing member (150) formed of epoxy resin may be coated in the gap formed between the base (20) and the housing (210), as in the second exemplary embodiment described in the above. Here, however, the sealing member (150) formed of epoxy resin in liquid state at room temperature may be priorly coated in a protruded partition (160) formed on the housing (210). Here, the protruded partition (160) may be formed on a surface opposite to the base (20). Here, a concave groove may be formed on a surface of the base (20) at a position opposite to the protruded partition (160). Here, the concave groove may be provided in a shape complementary to the protruded partition (60). Afterwards, the assembling of the base (20) and the cover can (40) may be performed.

In such case, the sealing member (150) injected and coated on the protruded partition (160) may be hardened, while being flowing down to the base (20) during a heat hardening process and inflowing to a spaced portion where the inflow of impurities may occur, for example, to the base (20) and the housing (210). Thereby, the gap, which can be generated when coupling the base (20) with the housing (210), may be sealed. Therefore, the inflow of impurities through the gap may be prevented.

Meanwhile, the sealing member (150) formed of epoxy resin according to the second to fifth exemplary embodiments of the present disclosure may be disposed at a position not interfering with the elastic member (400) configured to elastically support movement of the operator (30).

In addition, the sealing member (150) formed of epoxy resin according to the second to fifth exemplary embodiments of the present disclosure may have an additional effect of enhancing biding force of the base (20) and the housing (210), while the sealing member (150) is being hardened.

The previous description of the present disclosure is provided to enable any person skilled in the art to make or use the inventive concept. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

The camera module according to an exemplary embodiment of the present invention is industrially applicable to camera modules installed in small-sized electrical devices such as mobile phones, tablet PCs, etc.

What is claimed is:

1. A VCM (Voice Coil Motor) comprising:
a cover can comprising an upper plate and a lateral plate extending from the upper plate;
an operator comprising a bobbin disposed in the cover can and a coil disposed on the bobbin;
a magnet disposed between the coil and the lateral plate of the cover can and facing the coil;
a base coupled with the lateral plate of the cover can and comprising a groove formed on a lateral surface of the base;
a housing disposed between the base and the cover can;
a first sealing member disposed between the groove of the base and the lateral plate of the cover can; and
an elastic member coupled to the bobbin and the housing to locate the operator as to be floating over an upper surface of the base, when a driving signal is not applied to the coil,
wherein the first sealing member is in contact with the groove of the base and an inner surface of the lateral plate of the cover can,
wherein the base comprises a coupling pillar on the upper surface thereof,
wherein the housing comprises a coupling groove configured to couple with the coupling pillar.

2. The VCM of claim 1, wherein the groove of the base is inwardly recessed in a shape corresponding to the first sealing member from the lateral surface of the base.

3. The VCM of claim 1, wherein the base is in a shape of a rectangular parallelepiped and comprises a plurality of the coupling pillars on the upper surface thereof, the coupling pillars respectively disposed at each corner portion of the housing.

4. The VCM of claim 1, wherein a bottom end of the lateral plate of the cover can is contacted with the upper surface of the base.

5. The VCM of claim 1, wherein the first sealing member is formed of an elastically deformable material, such as rubber or silicon, such that a clearance space between the base and the cover can is sealed with the deformed first sealing member.

6. The VCM of claim 1, wherein the first sealing member seals a space between the lateral surface of the base and the lateral plate of the cover can.

7. The VCM of claim 1, wherein the first sealing member includes a lubricant coated on a surface contacting with the cover can.

8. The VCM of claim 1, wherein the first sealing member includes a coating layer formed on a surface contacting with the cover can.

9. The VCM of claim 1, wherein the base and the cover can are coupled with each other by an indentation combination.

10. The VCM of claim 1, further comprising a second sealing member disposed between the upper surface of the base and a lower surface of the housing.

11. The VCM of claim 10, wherein at least a portion of the second sealing member is disposed in an escape groove formed on the lower surface of the housing.

12. The VCM of claim 1, further comprising a cover member installed on an upper side of the cover can and configured to close an opening of the cover can.

13. A camera module comprising:
a printed circuit board mounted with an image sensor;
a cover member can comprising an upper plate and a lateral plate extending from the upper plate;
an operator comprising a bobbin disposed in the cover can and a coil disposed on the bobbin;
at least one lens coupled to the bobbin;
a magnet disposed between the coil and the lateral plate of the cover member can and facing the coil;
a base disposed on an upper surface of the printed circuit board, coupled to the lateral plate of the cover can, and comprising a groove formed on a lateral surface of the base;
a housing disposed between the base and the cover can and a first sealing member disposed between the groove of the base and the lateral plate of the cover can; and
an elastic member coupled to the bobbin and the housing to locate the operator as to be floating over an upper surface of the base, when a driving signal is not applied to the coil,
wherein the first sealing member is contacted with the groove of the base and an inner surface of the lateral plate of the cover can, wherein the base comprises a coupling pillar on the upper surface thereof,
wherein the housing comprises a coupling groove on an upper surface configured to couple with the coupling pillar.

14. A smart phone comprising: the camera module of claim 13, and a display part for displaying an object photographed by the camera module.

15. The camera module of claim 13, further comprising a second sealing member disposed between the upper surface of the base and a bottom surface of the housing.

16. The camera module of claim 15, wherein at least a portion of the second sealing member is accommodated in an escape groove formed on the bottom surface of the housing.

17. The camera module of claim 14, wherein the elastic member comprises an upper elastic member and a lower elastic member.

18. The camera module of claim 17, wherein each lower elastic member includes an internal elastic unit, an external elastic unit and a connecting elastic unit to connect the internal elastic unit and the external elastic unit.

19. The camera module of claim 18, wherein the internal elastic unit is disposed on a lower surface of the bobbin, and the external elastic unit is arranged on the upper surface of the base.

20. The camera module of claim 18, further comprising a cover member installed on an upper side of the cover can and configured to close an opening of the cover can.

* * * * *